Figure 1:
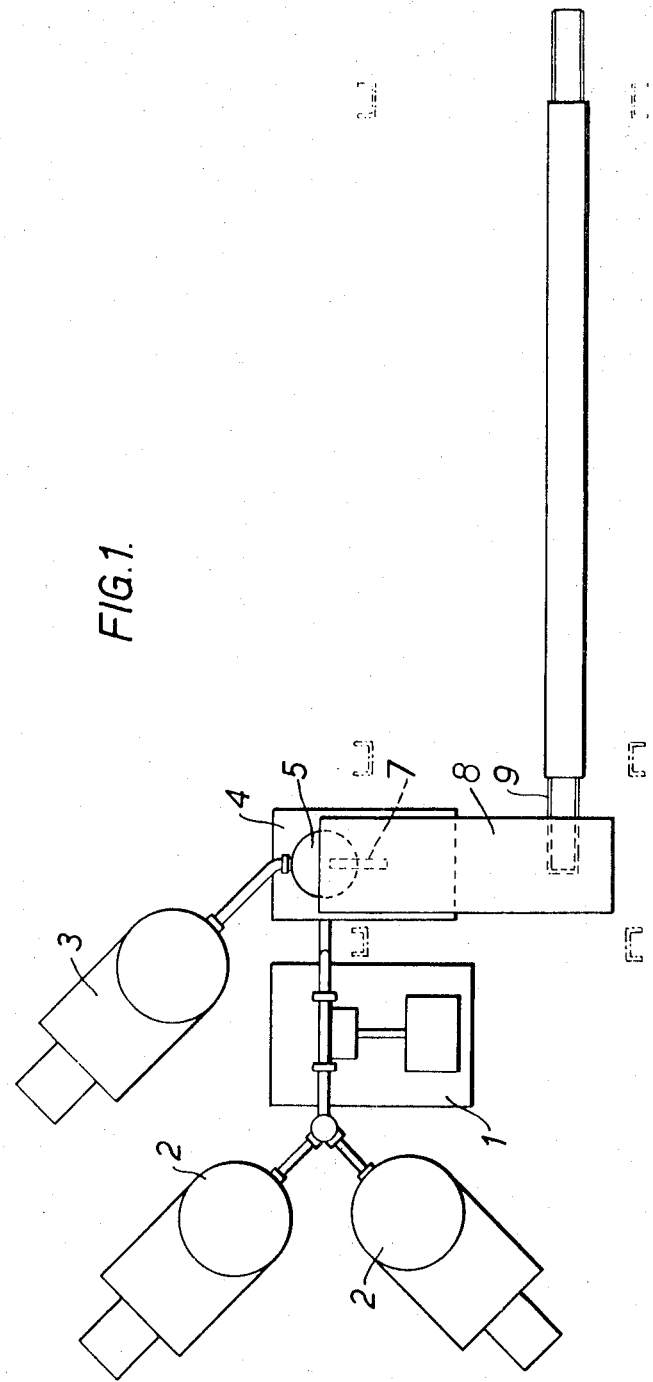

United States Patent

[11] 3,622,353

[72] Inventors Noel James Bradshaw
Sharnbrook;
Kenneth William Taylor, Higham Ferrers,
both of England
[21] Appl. No. 834,009
[22] Filed June 17, 1969
[45] Patented Nov. 23, 1971
[73] Assignee Lever Brothers Company
New York, N.Y.
[32] Priority June 18, 1969
[33] Great Britain
[31] 28,919/68

[54] SAUSAGE PREPARATION PROCESS
5 Claims, 4 Drawing Figs.
[52] U.S. Cl. ................................................. 99/169,
99/176
[51] Int. Cl. ....................................................... A23b 1/10
[50] Field of Search............................................ 99/109,
169, 176

[56] References Cited
UNITED STATES PATENTS

| | | | |
|---|---|---|---|
| 3,122,788 | 3/1964 | Liberman...................... | 99/176 |
| 3,193,604 | 7/1965 | Mercer.......................... | 99/176 |
| 3,306,754 | 2/1967 | Kielsmeier et al. ........... | 99/109 X |
| 3,425,846 | 2/1969 | Talty............................. | 99/176 |

FOREIGN PATENTS

| | | | |
|---|---|---|---|
| 807,863 | 1/1959 | Great Britain................ | 99/176 |

*Primary Examiner*—Tim R. Miles
*Attorneys*—Louis F. Kline, Jr., Melvin H. Kurtz and Edgar E. Ruff

ABSTRACT: Collagen-coated food products, particularly sausages, are prepared by extruding the collagen in tubular form upon the foodstuff and then setting it, one or both surfaces of the collagen being subjected during extrusion to frictional forces acting about the axis of extrusion. Such forces are conveniently applied by contrarotation of the inner and outer members of the die which is forming the collagen tube, the foodstuff being extruded simultaneously with the collagen through an axial bore in the inner member of the die.

INVENTORS:
NOEL JAMES BRADSHAW and
KENNETH WILLIAM TAYLOR

BY
THEIR ATTORNEY

SAUSAGE PREPARATION PROCESS

The invention relates to the preparation of collagen-coated foodstuffs, especially sausages.

There are two approaches to making of sausages. The first is to take natural or artificial sausage casing and stuff it with sausage meat and the second is to shape the sausage meat and then apply a material forming a coating or casing. The more fundamentally satisfactory approach is the second since it allows one to make the sausage in what is basically a continuous process. Intermediate stages of preparation and storage of casing and its filling with sausage meat are then avoided. However the economic and practical problems of the second approach have not been solved hitherto.

We have now found that collagen-coated foodstuffs, particularly sausages, can be made by a process in which a collagen dough is extruded in tubular form upon a foodstuff and the collagen coating so formed is stabilized, one or both surfaces of the collagen being subjected during extrusion to frictional forces acting in a direction about the axis of extrusion. The frictional forces are conveniently applied by relative rotational movement between inner and outer members of a die through which the collagen dough is being extruded. Preferably the movement is provided by rotation of the inner and outer members of a die in opposite senses.

In U.K. Pat. specification No. 807,863 there is disclosed a coextrusion process in which alginate, or spinning solution containing globular protein is extruded through a simple coaxial tube die, sausage meat being extruded with it. The process and apparatus disclosed would not work with collagen, which is difficult to extrude unlike alginate or the proteins used in the spinning dopes. Also, we have found, simple extrusion though a fixed die does not give a satisfactory product. The lining up of the elongate collagen fibers that occurs during such extrusion even if it is achieved gives a weak casing, liable to splits.

Attempts to provide an economic and satisfactory sausage, using collagen but without the preparation of artificial casing as such, we disclosed in U.K. Pat. specification Nos. 1,001,113 and 1,001,114 and U.S. Pat. specification No. 3,041,182. In the process described in the U.K. specifications sausage meat and collagen are extruded through a fixed die into a temporary outer casing, removed after a drying step when the collagen has achieved some coherence and the product will maintain its integrity. The process suffers from the disadvantages of requiring the temporary casing and of not being capable of giving a product in which the collagen coating has the orientation of the collagen fibers shown by the coating or casing of sausages prepared according to the present invention. Moreover the process requires the sausage meat to be extruded through a long narrow stuffing horn bearing the temporary casing in shirred form, so that working of the emulsion takes place and its physical properties are undesirably altered.

The U.S. specification No. 3,041,082 discloses a process in which sausage meat formed to the required shape and maintained in it by, for example, freezing, is coated with collagen by spray or dip. Again the process has economic disadvantages compared with the straightforward production of sausages and other products according to the invention, and is not capable of giving orientation of the collagen fibers. The spraying or dipping is not satisfactorily controllable and must be carried out with dilute solutions or dispersions of collagen with attendant difficulties. Also the freezing is likely to affect the quality of the product.

In a particularly preferred process according to the invention sausage meat or other extrudable foodstuff, particularly foodstuff to be fried such as hamburger, or beefburger mix or outside the meat field for example a cheese/potato mix, is shaped to receive the collagen by extrusion simultaneously with it, for example through an axial bore in the inner member of the die mentioned above. The bore is conveniently of the same cross section as the food product being prepared.

The collagen can be set by methods known in themselves in the preparation of artificial sausage casing. Conveniently extrusion takes place into a setting bath, containing for example common salt brine. Under the influence of the setting solution the collagen is coagulated, precipitated or set in contact with the extruded foodstuff and the formed length of coated foodstuff then emerges from a bath to undergo any further process steps required. Stabilization may however be by other means, for example air-drying.

It is believed that the application of the frictional forces orients the collagen fibers in the dough in such a way that the strength of the coating or casing is satisfactory in all directions even when the coating is very thin and therefore tender to eat. The coating produced by the contrarotating die is for example believed, from optical examination of coatings produced by the detail method described later, to have substantially all the fibers oriented. Fibers appear during extrusion to come under the influence of either the forces exerted by the one die or those exerted by the other, so that the fibers adjacent to one surface of the coating are aligned in one direction and these adjacent to the other surface are aligned in a different direction. There appear to be substantially no fibers of an intermediate orientation. Lining up the fibers of the direction of extrusion such as occurs in simple extrusion with fixed dies and leads to splits in the product is avoided and the control achieved over orientation of the fibers is in contrast with processes where collagen is applied to formed sausages by spray or dip. The position when only one die member rotates is less clear cut but there is still orientation with alignment in different directions.

The angle included between the fibers in the direction of the axis of extrusion has been measured in different samples for the contrarotating die extruder, all giving good cooking results and varies with the speed of rotation of the die members and with the other conditions. A wide range of angles, for example 30° is possible but the range 40° to 100° is preferred.

Particular results, with the viscosities giving them in conjunction with the different speeds of rotation of inner and outer die members, were as follows. Extrusion was at 15 ft./min. throughout and all showed good cooking results.

| Dough Viscosity | Rotation Inner r.p.m. | Speed Outer r.p.m. | Angle Between Fibers |
|---|---|---|---|
| 46 | 70 |  | 6489 |
| 46 | 92 | 72 | 69 |
| 64 | 92 | 87 | 78 |
| 67 | 70 | 64 | 51.5 |
| 67 | 110 | 84 | 77 |
| 82 | 110 |  | 8567 |
| 82 | 130 | 90 | 96 |
| 95 | 110 | 85 | 77 |

Where a die with a rotating inner member having an axial bore is used the sausage meat or other foodstuff advantageously passes through a tube inserted in the bore to isolate the foodstuff from moving parts. Such a tube can be virtually the same size as the product so that, for example, sausage meat does not have to be forced through a narrow-bore tube inserted in a shirred casing (which is necessarily of narrow diameter that nonshirred casing), and then be filled into the casing, with attendant mechanical working. The tube is ordinarily circular in internal shape giving a product of circular cross section but products of other shapes can be produced if the tube is appropriately shaped, and such products, or these extruded in circular form, can be further shaped after extrusion. Shapes rectangular in section, for example beefburgers 3 cm. by 0.5 cm. and of any desired length, can then be provided. If the tube is not circular internally there will be a considerable gap between the foodstuff and the collagen at the moment of extrusion but the combined effect of the dehydrating action of the setting solution and its hydrostatic pressure (a bath is conveniently used) the relative speeds of extrusion of collagen dough and foodstuff, and any subsequent drying, will give a coating conforming closely to the shape of the foodstuff. Modification of the shape of the product, for example by rolling, is desirably carried out before the drying. For the beefburgers a collagen-coated ribbon of beefburger mix is extruded, and then rolled if required, before cutting into separate beefburgers and drying.

Sausages for smoking, for example frankfurters, may be made by the process of the invention, as the present process permits very thin coatings. Preformed artificial casing is liable to become unacceptably tough on smoking.

The process steps subsequent to the setting of the collagen may be varied as required. Usually the product will require drying or other steps to bring the collagen from the set but still wet condition to a stable, handleable state. The casing may for example be tanned using such agents as formaldehyde, liquid smoke extracts, alum and dialdehyde alginic acid. The production of this last agent is described in Hall U.S. application Ser. No. 800,839.

In a particularly convenient process according to the invention the coated foodstuff after setting of the collagen in a salt-setting solution is simply dried in the presence of the salt taken up from the setting solution, preferably by forced blast air-drying. Provided an edible setting salt is used it is unnecessary to remove it in separate washing stages followed by drying stages, such as are required in the preparation of artificial casing to be used in the conventional manner. It has been found that, particularly when the foodstuff is sausage meat, the salt in the coating migrates into the foodstuff during processing and storage. The final coating has very satisfactory physical and eating properties.

The foodstuff may be cut into individual portions shortly after setting of the collagen or it may be treated as a continuous length and cut later.

When the foodstuff coated is a meat product the process of the invention provides a food product which is novel in itself, in that the extrusion of collagen onto the foodstuff and the subsequent setting and, desirably, drying causes an interaction of the collagen of the casing with the meat components of the foodstuff and gives a coating, corresponding in function to the casing of ordinary sausages, which is tender to eat but nevertheless of excellent strength and other properties. This coating differs from the casing on sausages made by the conventional stuffing procedures in that once drying has taken place the coating is to a degree part of the meat and cannot for example readily be stripped from it. Combination has taken place between the collagen protein of the coating and the protein of the meat particles, forming a combined structure in which the two are inseparable. If the coating is removed the outer layer of the meat comes off with it, in contrast to ordinary artificial casing. Differential shrinkage during cooking with extrusion of the meat can be reduced as compared with ordinary casing or even eliminated.

In the process of the invention the raw materials are collagen dough and, for example, pork or beef sausage meat. The preparation of the foodstuff is entirely conventional, and is not described here.

The collagen dough also can be prepared by processes known in themselves. It is preferred that the collagen used to make the dough should have been pretreated to break down partially the organized structure in the original native animal tissue used, for example hide or tendon, and render the collagen more soluble. There are various such processes, including enzyme treatments, but a preferred one is the treatment with alkali in the presence of salt described in Courts U.S. application Ser. No. 810,917. A full description of the preparation of a suitable dough, from the conventional unhairing of the hides to the final acid-swelling to give the dough, is given in Hawkins et al. U.S. application Ser. No. 806,923.

The viscosity of the collagen dough for use in the process of the invention is preferably for example 45 to 90 poise, most advantageously 60 to 70 poise, to obtain the best qualities in the product. The collagen solids content is correspondingly preferably 4.3 to 7.4 percent, most advantageously 5.2 to 5.8 percent. The extractability (as defined below) of the collagen used to make the dough is preferably 7 to 16 advantageously about 9.

The extractability is a measure of the breakdown of the native insoluble collagen matrix to give soluble material, and is defined as the proportion of a given collagen sample that is acid-soluble, as determined by any suitable method. Such a method is of course conveniently solution in an aqueous solution of an acid, for example 0.15 M acetic acid, but any other method that directly or indirectly gives an indication of the proportion of the sample that is in fact acid-soluble can be used. The solubility has reference to single tropocollagen molecules, the fundamental building units of collagen; their molecular weight is about 300,000.

The extractability of collagen for the purposes of the numerical preferences given herein is defined as the weight percentage of a 1.5 g. sample of milled collagen, pressed free of superficial moisture, taken up after 12 hours soaking at 20° C. in 100 ml. 0.15 M aqueous acetic acid, and remaining in solution after centrifugation for one-half hour at 27,000 g. any precipitate being discarded followed by filtration of the supernatant through a sintered filter of porosity No. 3. The amount of collagen in the supernatant may be determined by any convenient standard method, for example hydroxyproline analysis or the modified Biuret reaction, and is calculated as dry weight. The percentage is related to the dry weight collagen content of the sample. To determine this a sample conveniently 5.0 g. is dried to constant weight at 105° C. Fat and ash may be ignored in good collagen low in them if a preliminary determination has confirmed that they are indeed low.

The extractability is conveniently determined on the batch concerned since treated collagen can readily be held in store and in practice is so held to give a manufacturing 'float'. However, if the raw material is uniform enough the extractability can be determined by reference to a record of the value for a similar earlier batch, similarly treated, or can simply be assumed to be satisfactory.

The pretreatment for the collagen described in Courts U.S. application Ser. No. 463,021, now abandoned, is to soak the collagen in the form of pieces of hide split for example, in saturated or nearly saturated (preferably over 90 percent saturated) for a few hours, until it is uniformly impregnated, then to soak in a similar solution containing sodium hydroxide, preferably at a pH above 13, until the desired extractability is reached, the time required being found by simple experiment. The sodium sulfate prevents swelling of the collagen, which is not desired at this stage. Common salt is also effective as an antiswelling agent and so also are other alkali metal salts, for example potassium sulfate and potassium chloride. The time required is dependent on the conditions for example the temperature and the concentration of the sodium hydroxide. When for example sodium sulfate is being used and the temperature is 20° C. about 20 hours is sufficient in 1 N sodium hydroxide. Where sodium chloride is used as the antiswelling salt the time required at a given concentration of alkali is increased, for example at 1 N and 20° C. to 24 to 36 hours, with an optimum of 30 hours.

If the normality of the sodium hydroxide is increased the time required is reduced, the limit being believed to be set by the permeability of the collagen; excessively concentrated alkali overtreats and damages the outer part of a piece of collagen while not permeating sufficiently to treat the interior adequately.

After treatment the collagen is neutralized by soaking in acid, and washed. Its extractability is then determined if necessary, that is to say if the starting material is not such that the extractability can be assumed to be satisfactory. A batch of low extractability can be retreated; one of overhigh extractability is preferably discarded but can be mixed with later batches if desired.

While the extractability cannot readily be changed once the collagen has been milled in preparation for making the dough, it is easy to adjust the solids content by addition of water to give a viscosity in the final dough within the preferred range already noted. Process variations and variations in the starting material can therefore be allowed for, provided the extractability is within the given range. The solids content is readily determined for control purposes by analysis or for example by comparison of the weight of a given air-free volume sample with that of the same volume of water. Tables giving the solids content for a given weight ratio can be drawn up from a knowledge of the densities of collagen and water.

We do not limit the application of the invention by the following theory of the effect of alkali treatment where used but we believe the viscosity of the dough to be broadly a function of the concentration of collagen fibers in the dough and accordingly a heavily alkali-treated collagen, with few fibers, can give a high enough viscosity if the dough is of high total solids content, while a lightly alkali-treated collagen can give a low enough viscosity if the dough is of low total solids content. In each case the coating produced is believed from qualitative optical assessment to have about the same number of fibers in a given area and is of the desired properties. In general, whatever collagen is used, too many fibers are believed to give a coating tough to eat and liable to splits in the pan and too few a weak one, liable to bubbling.

In the preparation of the dough acid swelling of the collagen is preferred. When it is used the final pH of the dough is preferably 2.8 to 3.5, more preferably 2.9 to 3.1. Suitable acid swelling agents are well known in themselves. Organic hydroxy acids are examples, in particular citric acid and lactic acid, of which the latter is preferred. Where alkaline swelling is used, effected by for example caustic soda, the final pH is preferably 11.5 to 12.2, advantageously 11.8 to 12.1.

The following gives details of the preferred conditions during the coextrusion and subsequently.

The setting solution preferably contains a salt for example common salt brine 50 to 100 percent saturated, preferably over 75 percent saturated. It may, when an acid-swollen dough is used, also contain sufficient ammonia to be about N/10 with respect to ammonium hydroxide; the pH of such a solution is between 10 to 12. The action of the setting bath by withdrawal of water is then assisted by neutralization of the acid, indeed setting is possible by neutralization alone. Other setting solutions, for example ammonium sulfate solution, are suitable but not preferred since washing to remove material taken up in the bath may be necessary. Other salts also are suitable, provided they are not taken up by the product in amounts which affect its edibility and cannot, if necessary, be removed. Nontoxic salts are for example sodium sulfate, disodium hydrogen phosphate, trisodium phosphate, trisodium citrate and corresponding potassium salts. There are also organic-solvent-setting liquids, for example methanol/ammonia. A setting bath is conveniently used and the required depth, found by simple experiment, varies according to the time required to impart the necessary strength to the collagen, and accordingly also with the extrusion speed. At an extrusion speed of 25 ft./min. (12 cm./sec.) a setting bath depth of 12 inches (30 cm.) is sufficient, giving a residence time of 2.4 seconds. Shorter residence times are possible however and in any case the setting solution continues to act during the draining that takes place after the product has left the bath. The dough is extruded at a speed consistent with the rate of extrusion of the foodstuff, generally at the same speed. If desired however the foodstuff, sausage meat for example, can be extruded slightly faster than the dough, to give some drawdown, that is to say stretching and if required narrowing of the extruded collagen.

The chosen rate of extrusion can vary over a considerable range, from rates as low as 5 or 6 ft./min. (2.5 cm./sec.) up to 45 ft./min. (22 cm./sec.) or more speeds up to 100 ft./min. (50 cm./sec.) or more. The thickness of the coating at a given rate of extrusion of the foodstuff can be varied by varying the volume rate at which the collagen dough is extruded. The corresponding thickness of the coating is not easy to measure because of the combination with the foodstuff that takes place and the softness and flexibility of the coating but is for example ordinarily about 4 thousandths of an inch (ca. 0.1 mm.) after drying to approximately 40 percent water content. Generally a minimum of about 2 thousandths of an inch is believed to apply if adequate properties are to be obtained and similarly a maximum of about eight thousandths of an inch were the best results of lack of noticeability and toughness are required. In the case of chipolata sausages for example the rate of collagen extrusion is preferably such as to give between 4 and 10 grams of the set but still wet collagen per foot of product (ca. 13–33 g./meter) for chipolatas of 0.72 inch (1.8 cm.) diameter. Such a weight per foot corresponds to a thickness of about nine to twenty-three thousandths of an inch in the set but still wet casing. This thickness is reduced from the thickness of the extruded collagen dough by the action of the setting solution. The actual thickness depends on the size of the gap through which the collagen dough is extruded and on the volume rate of extrusion. Suitable rates for other products are readily found by simple trial. It is a considerable advantage of the invention that only about 60 percent of the collagen required to make a corresponding length of artificial casing need be used, and this is on top of the saving in avoiding twist linking, as mentioned elsewhere herein. The actual extrusion pressure is chosen according to the plant in use; pressure of 80 to 120 p.s.i. (5.5 to 8.5 kg./sq. cm.) are for example suitable with a stuffer of the kind used for sausage meat.

The temperature of the dough and setting solution can be ordinary ambient factory temperature, say 15° to 25° C. or the dough or both the dough and the setting solution may be chilled. Low temperatures may however increase the viscosity of the dough without compensating advantage, while higher ones may have a bad effect on the collagen. Generally a temperature of about 40° is preferably not exceeded in the setting solution since higher temperatures may deleteriously affect the properties of the collagen.

The extruder itself is preferably, according to the invention, a contrarotating die extruder, particularly one having contrarotating cones between which the dough passes, as described below. The preferred gap between the cones is fifteen to twenty thousandths of an inch (0.35 to 0.5 mm.), but other gaps, for example between ten and twenty-five thousandths of an inch (0.25 to 0.60 mm.) can be used. The cones of the extruder are preferably rotated at the same speed as each other or with about up to about 30 r.p.m. for example 10 to 15 r.p.m. difference. Various speeds of rotation can be used, for example 60 to 120 r.p.m. If only one cone is rotated its speed should be higher, preferably high enough to give the same relative speed of 120 to 240 r.p.m. for example 155 r.p.m.

In the case of sausages the length of sausage is preferably 'crimped' or otherwise shaped by pushing aside the sausage meat within the casing to define individual sausages, directly after the extrusion, that is to say before any drying. The sausages can be cut apart then or later.

In drying conditions may vary but at an air temperature of 15° to 25° C. and an absolute humidity of up to about 0.012 (12 g. water per kg., dry air) an air speed of 2,000 ft./min. (10 to 15 m./sec.) is suitable. Ambient humidity in the United Kingdom is not usually above 0.009 (9 g./kg.). Such an airspeed gives drying in a sufficiently short time for the length of drying conveyor necessary to be manageable, using ambient air, but if the air is warmed for lower speeds, for example down to 300 ft./min. (1.5 m./sec.) may be used. Further advantages may be gained by dehumidifying the air. The air temperature is preferably not above about 45° C. for English sausages since there is a tendency for the meat to be discolored and for melting of the fat to occur in the sausage meat at higher temperatures, and a product of lower quality is produced. This tendency is accentuated near the end of the drying when less water is evaporating from the product and the resulting cooling effect is less.

The progress of the drying of sausages may be followed by attempting to remove the coating or casing. Drying has reached an acceptable degree when the casing can be no longer removed cleanly but brings the meat with it. It is however desirable to dry further. The moisture content of the coating after leaving the setting solution is generally some 80 or 85 percent. Drying is preferably carried out until a 50 percent moisture content, and advantageously until a 40 percent moisture content, is reached. During equilibration of moisture content between foodstuff (sausage meat) and coating the moisture content rises again, to some 65 to 75 percent.

The actual residence time required in the drier is determined by simple experiment of the equipment in use and is a function of air velocity, temperature, humidity, and product size. A typical range of times for sausages is however 5 to 30 minutes. After drying the product is preferably chilled to reduce the temperature below 10° C. and then packed and stored for sale.

In the coating or casing itself, the salt content of a salt-bath set product is generally about 4 to 7 percent after the extrusion and about 3 to 4 percent after 48 hours equilibration, when the salt has migrated into the foodstuff. The pH after extrusion of an acid swollen dough, for example a pH 3 dough, is generally about 4.2 to 4.7 after extrusion into an ammonia/brine bath, rising after equilibration to, for example, 5 to 6.4

Figure 2:
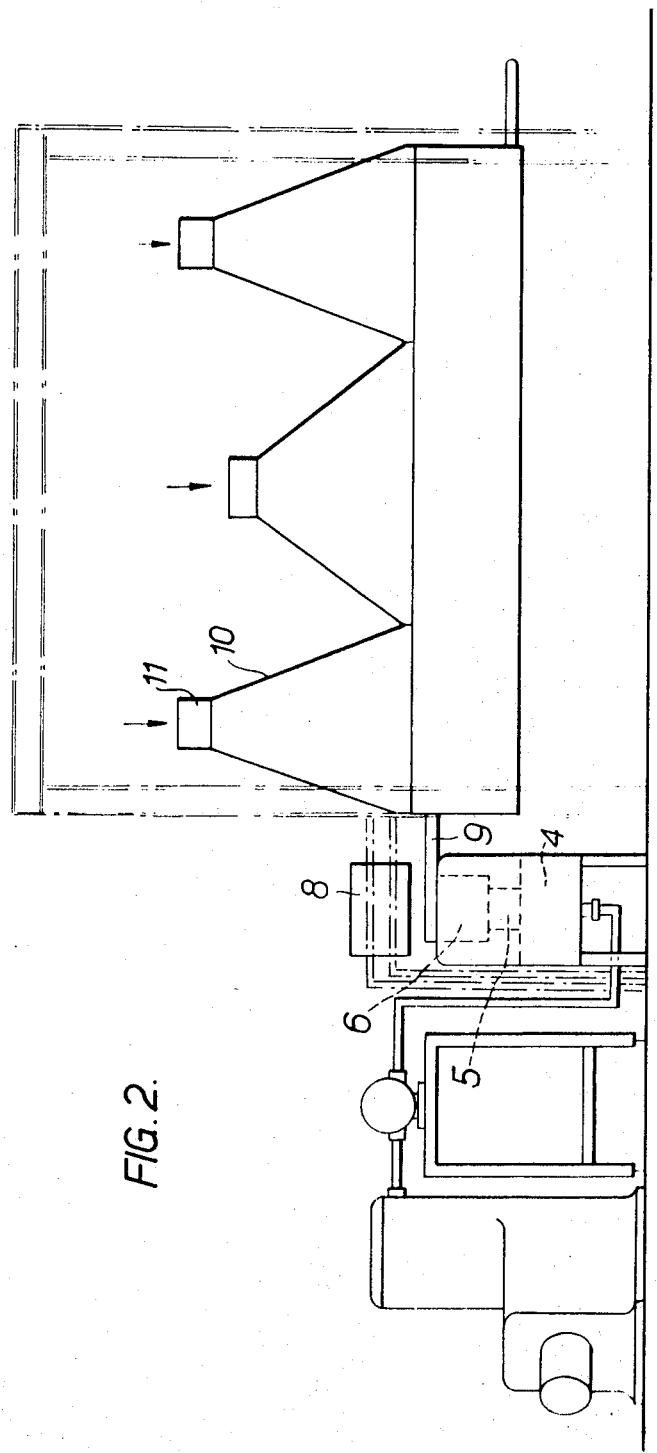
Figure 3:
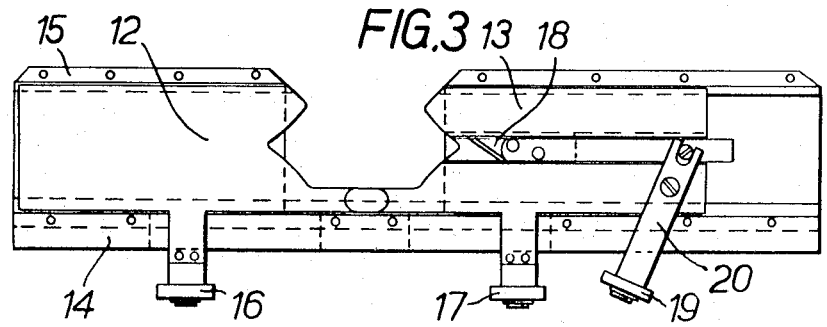
Figure 4:
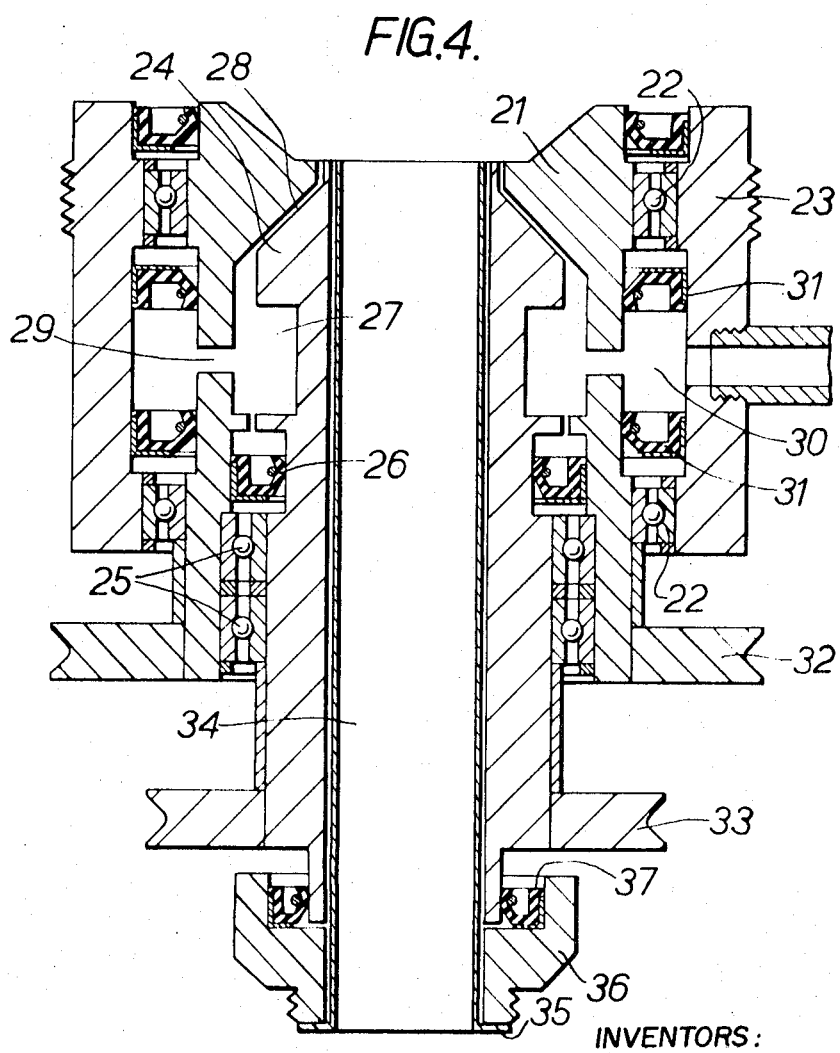

Plant suitable for carrying out the process of the invention in the case of the production of sausages is described by way of example with reference to the accompanying drawings. In the drawings FIG. 1 is a diagrammatic plan view of the plant;
FIG. 2 is a diagrammatic elevational view;
FIG. 3 is a diagrammatic view of the crimper/cutter, and
FIG. 4 is a section of the extruder used in the plant.

In the FIGS., 1 is a constant-displacement metering pump for sausage meat fed by two sausage stuffers 2 of conventional type working in tandem through a changeover valve so that while one is filling the other is delivering and continuous extrusion can be maintained. The collagen dough is fed to the extruder by a further stuffer 3. The sausage meat and dough pass to the contrarotating cone extruder described below.

In the extruder unit and its associated setting bath, 4 is the support and drive motor stand of conventional construction and 5 is the actual setting bath in the bottom of which the extruder 6 is mounted. Brine is circulated to the setting bath by means not shown, to maintain the concentration of the salt.

The elongated sausage emerging from the setting bath passes over a wheel 7 to a conveyor 8 on which it is lightly held by the crimper/cutters described below. The conveyor allows draining of excess setting solution back into the bath and gives the setting solution a short further period to act on the casing before the sausages are actually separated and dropped onto the further conveyor 9. It is found, surprisingly, that the collagen coating closes round sufficiently at the ends of the individual sausages formed under the action of such a cutter and subsequent drying, to retain the meat and give a satisfactory product without any need for the conventional twist-linking procedure hitherto employed. The collagen wasted in twist linking (about 8 percent of the total length of natural or artificial casing used) is saved and the production of the tough little bits of twist is avoided.

The conveyor 9, which is of conventional construction, passes through an air drier, in which the air is fed through separate hoods 10 of tapered overall shape but constant cross section designed to give a uniform airflow over the belt and themselves fed with air by conventional motor-driven fans 11.

The crimper-cutter consists of two vee-formed members 12 and 13 sliding in fixed upper and lower guides 14 and 15. A number of assemblies are mounted by means of the guides on the conveyor 8, which is of twin chain construction, and the distance between the assemblies determines the length of each sausage. The elongated sausage leaving the wheel 7 is fed into the vee cutouts in the sliding members and the vees slowly close, under the action of two cams between which the conveyor passes and which act through followers 16 and 17. The vees displace the meat within the coating to form individual sausages with rounded ends until only a thin neck of the coating is remaining. The neck is then cut, to separate individual sausages, by a knife 18 moving forward under the action of another cam on a roller 19 and slotted arm 20. Alternatively the sliding vee members may shear the skin.

The extruder as shown in FIG. 3 has a 45° outer cone 21 carried in the ultrahigh-precision bearings 22 in the head 23, which is screw-threaded for mounting in the bottom of the coagulating or setting bath. The inner cone 24 is carried within the outer one on further bearings 25. The members of the extrusion die are constituted by the two cones, the gap between them being twenty thousandths of an inch (0.48 mm.). A seal 26 is provided between the inner and outer cones and prevents escape of dough from a dough annulus 27 which feeds the gap 28 between the cones. The dough annulus is itself fed, through channels 29 in the outer cone, from a stationary feed annulus 30 which surrounds the cone and is sealed against it by seals 31. Concentric extensions 32, 33 of the cones take belt drives. Through the center of the inner cone and its drive extension passes a bore 34. This bore takes a fixed tube 35 for the sausage meat, 0.75 in. (1.9 cm.) diameter, clamped to a flange 36 by a coupling (not shown) on the supply line for the meat. A seal 37 is provided to prevent any escape of the setting solution.

The using the plant the collagen is first started extruding and the setting bath is then filled, the die parts being thus protected from blocking by set collagen. When extrusion of collagen is going smoothly the sausage meat is started and as soon as an even product is emerging the conveyor 8 is brought into action and the product fed to it. Operation is then automatic. Shutting down is the reverse.

The plant produces a product of very uniform weight. In a test run 33 consecutive nominal ½-lb. lots of sausages, dried, were weighed. The mean was 7 oz. 13 drams and the variation exceeded ±1 dram in only five instances, four of ±2 and one of +3.

The invention is illustrated by the following examples.

EXAMPLE 1

A green hide from an 18-month steer was trimmed, halved, washed and unhaired as in stage 1 of the procedure described in Hawkins et al. U.S. application Ser. No. 806,923. It was then split and the flesh layers, weighing 12 kg. at 20 percent dry collagen solids were cut into 6-inch (14-cm.) squares and steeped at 20° C. for 4 hours in 50 liters of saturated sodium sulfate solution. The solution was then replaced by a similar solution containing additionally caustic soda adjusted to 1-N, which was allowed to act for 22 hours with periodic addition of flake caustic soda to maintain the normality of the solution. After the treatment of the splits were washed three times for 10 minutes in water and then soaked for 1½ days in 100 liters of hydrochloric acid solution, pH 4, containing 2.4 kg. common salt. After this time the splits were neutral at the center. They were washed, minced and milled as in the said procedure the temperature being maintained at approximately 20° C. The resulting milled collagen was found to have a solids content of 8 percent and an extractability of 9.3 measured by the detailed method described herein, and was remilled six times after addition of 14 liters of 0.75 percent v./v. aqueous glycerol to give a material of 5.6 percent solids content and 6 percent glycerol content. The glycerol is not essential.

The milled collagen was then converted to an acid-swollen dough of pH 3.05, apparent viscosity 68 poise, by passing it through an Oakes Mixer, 0.9 kg. of lactic acid being fed evenly into it by a metering pump as it passed to the mixer. The dough was finally deaerated into a Z-blade mixer under a reduced pressure of approximately 2.5 cm. of mercury and allowed to stand in chill for 36 hours.

A conventional English sausage meat mix was prepared from the following ingredients (parts by weight)

Lean pork meat                      15 parts

| | |
|---|---|
| Fat port | 15 parts |
| Rusk | 4.7 parts |
| Salt | 0.57 part |
| Skim milk powder | 0.9 part |
| Water | 9 parts |
| Seasoning | 0.1 part |

The skim milk and half the water were stirred together then added to the lean meat in a conventional bowl chopper. The mixture was chopped for 3 minutes, the salt and seasoning and the rest of the water being added as chopping commenced and the rusk and fat pork after 2 minutes.

Coextrusion was then carried out as described above, the dough being supplied to the die at 125 p.s.i. (1.75 kg./sq. cm.) at a feed rate to give 6.4 g./ft (21 g./m.). The extrusion rate was 25 ft./min. (12 cm./sec.) and the inner and outer cones to the die were contrarotated at 70 and 85 r.p.m. respectively. The setting bath contained saturated salt brine N/10 with ammonia (pH 10), and was 12 inches (30 cm.) deep.

The sausage produced was 0.75 inches diameter (1.9 cm.) and was cut into 4-inch (10.2 cm.) lengths to give approximately 13 to the lb. (31 to the kg.) sausages. These were dried at an airflow rate of 2,000 ft./min. (10 m./sec.) with residence time of 13 minutes, the temperature of the air being 23° C. and the absolute humidity 0.0045.

The coating of the resulting sausages had a water content of 31.7 percent and after equilibration of salt and moisture content had been allowed to take place was of excellent appearance and quality. The water content of the coating after equilibration was 67.5 percent. Figures for pH were 4.5 before and 5.8 after equilibration, and for salt content 5.7 percent before and 3.6 percent after equilibration.

EXAMPLE 2

A collagen dough was prepared as in example 1, having a viscosity of 70 poise.

The following beefburger mix was prepared:

| | |
|---|---|
| 90:10 lean beef | 60 lb. |
| Beef fat | 20 lb. |
| Rusk | 3 lb. |
| Salt | ½ lb. |
| Seasoning | ¾ lb. |
| Water and ice | 14¾ lb. | the lean beef being first minced and then chopped in a bowl chopper with successive additions of the water and ice, salt, seasoning rusk and fat, until evenly mixed.

Coextrusion was then carried out in the plant described but using a die of 2 inches diameter with a tube of rectangular internal cross section in the bore. The extrusion speed was 14 ft./min., at a contrarotating die speed of 70 inner and 70 outer, and the bath being saturated common salt brine at pH 10 with ammonia, 12 inches deep. The burger emerged as a strip 1.5 inches × 0.5 inches, and was cut into 3-inch lengths. These were dried at an airspeed of 2,000 ft./min, at a temperature of 20° C. and absolute humidity of 0.007. Drying time 9 min. Final casing moisture content was 28.7 percent.

The product cooked well with no splitting or sticking in the pan.

EXAMPLE 3

A coextruded sausage was prepared as in example 1 and the coating set as in that example. After setting the product was washed for 1½ minutes in N/10 aqueous ammonia to remove part of the salt, and then dipped for 10 seconds in a 3 percent weight/volume solution of dialdehyde alginic acid. After drying as described the coating was examined and was found to be of improved strength and appearance compared with an untanned coating.

In a further run the procedure was modified by drying the product after setting, then washing, treating with the dialdehyde alginic acid and redrying. Further improved results were obtained.

What is claimed is:

1. Process for the preparation for a collagen-coated food product comprising extruding
   i. a collagen dough in tubular form upon a foodstuff, the collagen dough being subjected during extrusion to frictional surface forces acting in a direction about the axis of extrusion sufficient to orient collagen fibers contained in the outer surface of the formed coating in one direction and the fibers in the inner surface in another direction;
   ii. stabilizing the collagen coating so formed by contacting the produce with a salt-containing collagen-setting solution; and
   iii. subjecting the product to drying conditions until the moisture content of the collagen coating is below 50 percent, preferably below 40 percent by weight.

2. A process for the preparation of a collagen-coated food product comprising extruding a collagen dough in tubular form upon a foodstuff, the collagen dough being subjected during extrusion to frictional forces acting in a direction about the axis of extrusion, sufficient to orient collagen fibers contained in the outer surface of the formed coating in one direction and the fibers in the inner surface in another direction; and subsequently stabilizing said coating formed upon said foodstuff.

3. A process according to claim 2, in which the foodstuff is shaped to receive the collagen by extrusion simultaneously with the collagen.

4. The process of claim 2 wherein the angle between the two directions of orientation is about 30° to 120°.

5. The process of claim 2 wherein the angle between the two directions of orientation is about 45° to 100°.

* * * * *